(12) United States Patent
Guenthner

(10) Patent No.: US 6,442,676 B1
(45) Date of Patent: Aug. 27, 2002

(54) PROCESSOR WITH DIFFERENT WIDTH FUNCTIONAL UNITS IGNORING EXTRA BITS OF BUS WIDER THAN INSTRUCTION WIDTH

(75) Inventor: Russell W. Guenthner, Glendale, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/345,330

(22) Filed: Jun. 30, 1999

(51) Int. Cl.[7] .................................. G06F 9/30
(52) U.S. Cl. .................. 712/210; 710/305; 710/307; 712/221
(58) Field of Search ................ 712/210, 221; 710/126, 127, 305, 307

(56) References Cited

U.S. PATENT DOCUMENTS

| | | | | |
|---|---|---|---|---|
| 4,542,476 A | * | 9/1985 | Nagafuji | 708/518 |
| 5,155,820 A | * | 10/1992 | Gibson | 712/210 |
| 5,652,900 A | * | 7/1997 | Yoshida | 709/100 |
| 5,903,772 A | * | 5/1999 | White et al. | 712/33 |
| 6,189,090 B1 | * | 2/2001 | Tan et al. | 712/229 |

* cited by examiner

Primary Examiner—Kenneth S. Kim
(74) Attorney, Agent, or Firm—B. E. Hayden; J. H. Phillips; J. S. Solakian

(57) ABSTRACT

A data processing system contains a processor supporting both Narrow and Wide instructions and Narrow and Wide word size fixed-point and floating-point operands. The processor communicates over a bus utilizing a Wide word size with the remainder of the data processing system consisting of industry standard memory and peripheral devices. Narrow word sized instructions are stored on Wide word-sized storage devices. In a preferred embodiment, the processor bus has a first integer number of significant data lines. The processor is responsively coupled to the processor bus and includes a first decoder for decoding a first set of instructions received over the set of processor data lines, The first set of instructions each contains a second integer number, less than the first integer number, of significant bits. Fixed point arithmetic operations of a first class are performed in response to instruction decode by the first decoder on a first set of fixed point operands received over the set of processor data lines, wherein each of the first set of fixed point operands contains the second integer number of bits. Fixed point arithmetic operations of a second class are performed on a second set of fixed point operands received over the set of processor data lines, wherein each of the second set of fixed point operands contains the first integer number of bits. Corresponding processing is carried out in performing first and second classes of floating point operations.

17 Claims, 5 Drawing Sheets

PROCESSOR WITH DIFFERENT WIDTH FUNCTIONAL UNITS IGNORING EXTRA BITS OF BUS WIDER THAN INSTRUCTION WIDTH

CROSS REFERENCE TO THE RELATED APPLICATION

This application is related to our copending patent application entitled "DATA PROCESSING SYSTEM HAVING A BUS WIDER THAN PROCESSOR INSTRUCTION WIDTH", filed Mar. 31, 1999, with Ser. No. 09/282,866, and assigned to the assignee hereof.

FIELD OF THE INVENTION

The present invention generally relates to data processing systems, and more specifically to computer processors capable of supporting 32, 36, or 48 bit instructions installable and communicating using 64 bit industry standard busses and peripherals.

BACKGROUND OF THE INVENTION

There are millions of lines of code in existence that execute on proprietary hardware. For example, the assignee herewith sells GCOS® 8 hardware and software. GCOS® 8 is a proprietary thirty-six (36) bit system. Another proprietary thirty-six (36) bit system is the 1100/2200 systems sold by Unisys Corporation. A number of companies sell proprietary thirty-two (32) bit systems.

The cost of continuously developing ever more powerful proprietary systems continues to increase. Part of the cost of developing follow-on proprietary systems is the cost of developing custom I/O interfaces and the like. Continuous development in this area is extremely expensive.

It would thus be advantageous to have a system where NARROW legacy code can be easily executed, while still being able to utilize industry standard components.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

A data processing system contains a processor supporting both Narrow and Wide instructions and Narrow and Wide word size fixed-point and floating-point operands. The processor communicates over a bus utilizing a Wide word size with the remainder of the data processing system consisting of industry standard memory and peripheral devices. Narrow word sized instructions are stored on Wide word-sized storage devices. The translation between Narrow and Wide word sizes can be either at a byte/Unicode level, or at a word level.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Figure 1:
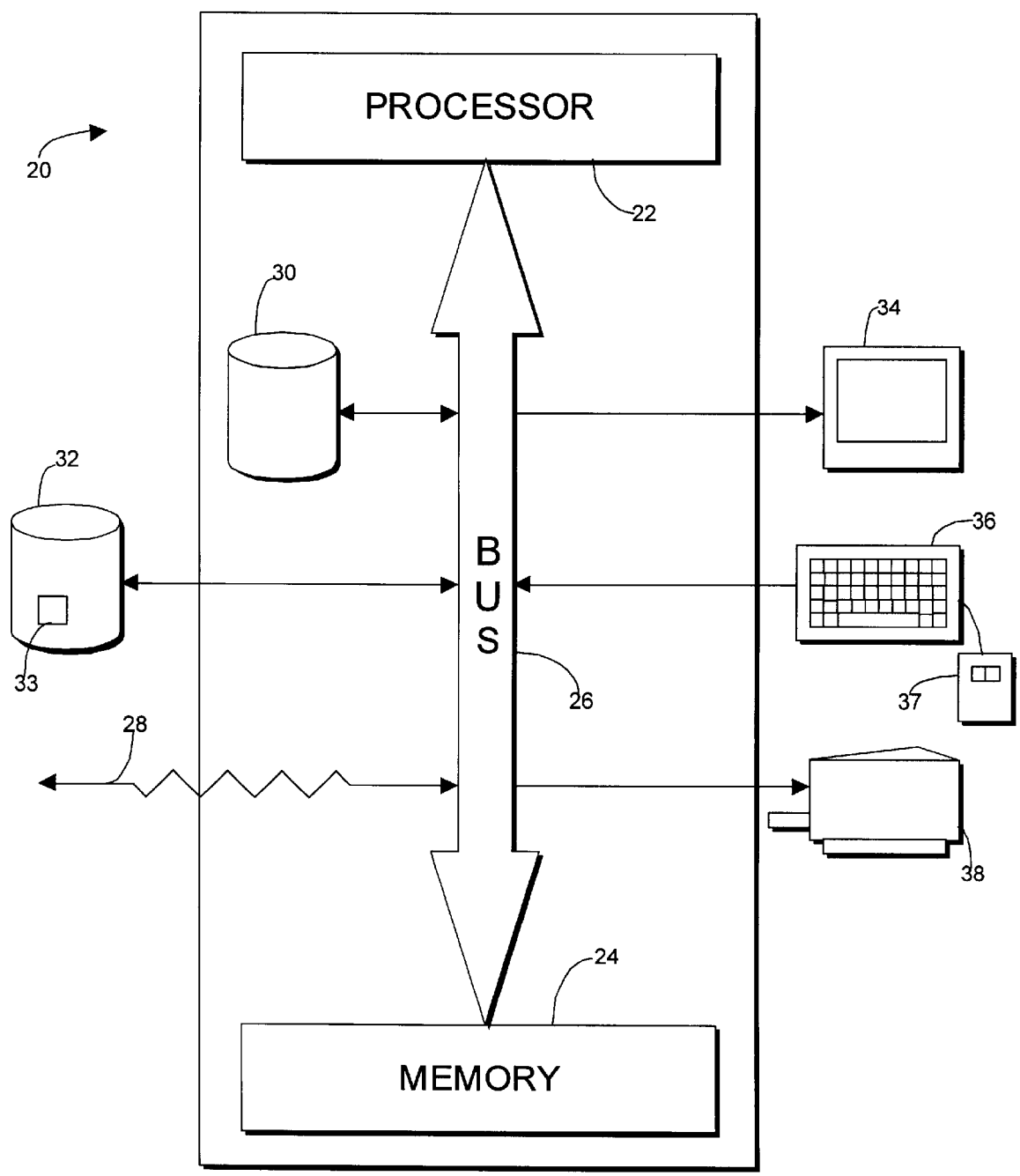
FIG. 1 is a block diagram illustrating a General Purpose Computer.

FIG. 1 is a block diagram illustrating a General-Purpose Computer 20 or data processing system. The General Purpose Computer 20 has a Computer Processor 22, and Memory 24, connected by a Bus 26. It should be noted that a single bus 26 is shown in this and subsequent FIGs. This is done for clarity. It should be understood that presently such a bus 26 is typically implemented as a hierarchy of busses. Memory 24 is a relatively high speed machine readable medium and includes Volatile Memories such as DRAM, and SRAM, and Non-Volatile Memories such as, ROM, FLASH, EPROM, EEPROM, and bubble memory.

Also connected to the Bus are Secondary Storage 30, External Storage 32, output devices such as a monitor 34 and a printer 38, and input devices such as a keyboard 36 and mouse 37. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software including user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
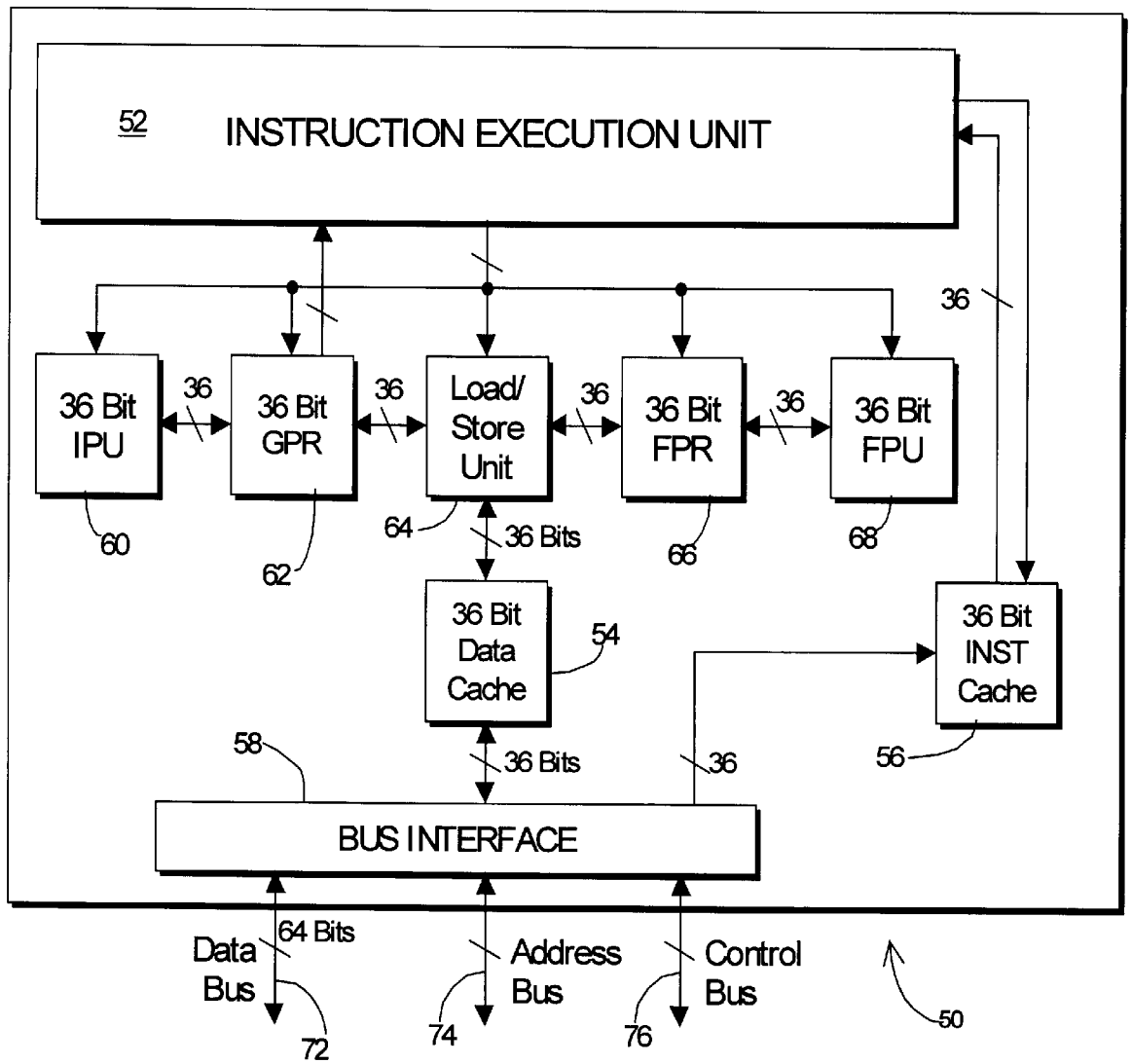
FIG. 2 is a block diagram of a first processor, in accordance with the present invention.

FIG. 2 is a block diagram of a first processor 50, in accordance with the present invention. The processor 50 is coupled to a bus 26. The bus 26 comprises a sixty-four (64)

bit data bus 72, a thirty-six (36) bit address bus 74, and a control bus 76. As noted above, the bus 26 is typically implemented as a hierarchy of busses. In this instance, the data bus 72, address bus 74, and control bus 76 together comprise a processor bus. The data bus 72, the address bus 74 and the control bus 76 are coupled to a bus interface 56. Thirty-six (36) address bus 74 lines are utilized to conform to the Intel® Pentium® II interface. Other configurations are within the scope of this invention. The bus interface 56 is coupled to a thirty-six (36) bit data cache 54 and a thirty-six (36) bit instruction cache 56. The thirty-six (36) bit data cache 54 and the thirty-six (36) bit instruction cache 56 are typically constructed of high speed SRAM. The coupling between the data cache 54 and the bus interface 58 is typically bi-directional, whereas the coupling between the bus interface 58 and the instruction cache 56 is typically single directional, since there is typically no need to write instructions back to slower memory 24. In the preferred embodiment, there are thirty-six (36) data signal lines coupling the bus interface 58 with the data cache 54 and instruction cache 56.

The instruction cache 56 is coupled to and provides instructions to an instruction execution unit 52. In the preferred embodiment, the instructions are thirty-six (36) bits in length. Typically, such an instruction execution unit 52 provides for pipelined execution of multiple instructions, synchronization of out-of-order execution, and branch prediction. However, these optimizations are not necessary to practice this invention. The instruction execution unit 52 provides control signals to control execution of a thirty-six (36) bit Integer (or fixed-point operand) Processing Unit 60, thirty-six (36) bit general (or fixed-point operand) purpose registers 62, a thirty-six (36) bit load/store unit 64, a thirty-six (36) bit floating-point unit 68, thirty-six (36) bit floating-point registers 66, the thirty-six (36) bit data cache 54, and the thirty-six (36) bit instruction cache 56. The load/store unit 64 is bidirectionally coupled to the thirty-six (36) bit general purpose registers 62, the thirty-six (36) bit floating-point registers 66 and the thirty-six (36) bit data cache 54. The load/store unit 64 loads thirty-six (36) bit values into the thirty-six (36) bit general purpose registers 62 and floating-point registers 66 from the thirty-six (36) bit data cache 54, and writes them back to the thirty-six (36) bit data cache 54, as required. The thirty-six (36) bit general-purpose registers 62 are bidirectionally coupled to and utilized by the thirty-six (36) bit integer processing unit 60 to perform integer arithmetic, as well as other logical functions. Such an integer processing unit 60 typically comprises logical/shift modules, integer addition/subtraction modules, and integer multiplication/division modules. The thirty-six (36) bit integer processing unit 60 will typically set condition code flags in one or more condition code registers in the thirty-six (36) bit general purpose registers 62 based on the results of the arithmetic and logical functions performed. These condition code flags are provided to the instruction execution unit 52 for use in conditional branching. In this preferred embodiment, the thirty-six (36) bit integer processing unit 60 provides for thirty-six (36) bit arithmetic and logical functions. Similarly, the thirty-six (36) bit floating-point registers 66 are bidirectionally coupled to and utilized by the thirty-six (36) bit floating-point unit 68 to perform thirty-six (36) bit floating-point arithmetic functions.

A single integer processing unit 60 and floating-point unit 68 are shown in this and subsequent FIGs. This is done for clarity in this and the subsequent FIGs. The present invention may include more such units. In particular note that a pipelined processor 50 will typically contain multiple integer processing units 60 providing multiple concurrent integer computations, and multiple floating-point units 68 providing multiple concurrent floating-point computations.

The processor 50 shown in FIG. 2 is preferably a thirty-six (36) bit processor, with thirty-six (36) bit data paths between functional units. This thirty-six (36) bit processor can plug into an industry standard sixty-four (64) bit processor slot. This has the advantage that thirty-six (36) bit code can be executed on a computer system 20 that utilizes industry standard memory 24, bus 26, secondary storage 30, external storage 32, and other peripherals. This ability to utilize industry standard parts significantly reduces the cost of implementing a thirty-six (36) processor architecture, without the loss of any functionality.

The architectures shown herein are shown utilizing two different width architectures: a thirty-six (36) bit "NARROW" architecture, and a sixty-four (64) bit "WIDE" architecture. In the preferred embodiment, the thirty-six (36) bit "NARROW" architecture is the proprietary GCOS® 8 architecture provided by the assignee herein. The sixty-four-(64) bit "WIDE" architecture is preferably the Intel® IA-64 architecture. Thus, a thirty-six-(36) bit GCOS® 8 processor 50 is slot and bus compatible with the sixty-four-(64) bit IA-64 architecture. It should be noted that this invention covers other combinations of "NARROW" and "WIDE" architectures. For example, most micro-processors presently utilize thirty-two (32) bit architectures. Such thirty-two (32) bit architectures typically support four eight-bit bytes. Each eight-bit byte can be utilized to store a single value ranging from zero to 255. Presently, this is sufficient for most applications that need to store English language text. It is not sufficient to store Japanese and Chinese characters. For this reason, the computer industry is undergoing a transition from using eight-bit bytes to using sixteen-bit unicode bytes. Four of these sixteen-bit unicode bytes can be combined into a sixty-four (64) bit word. This invention provides the capability of easy migration from the use of eight-bit bytes to the use of sixteen-bit unicode bytes.

Figure 3:
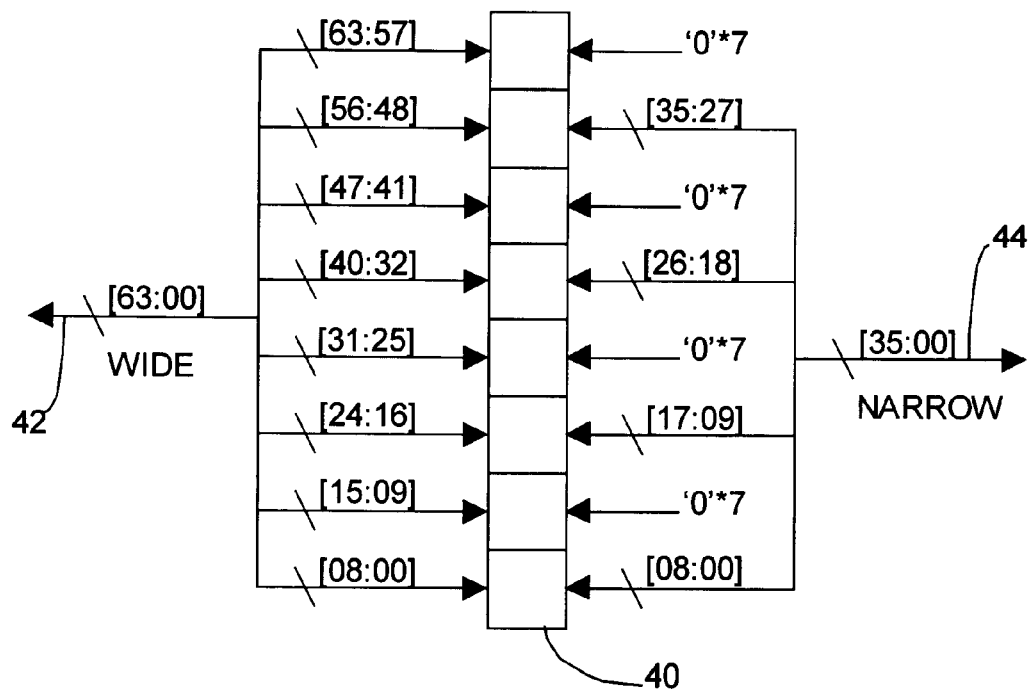
FIG. 3 is a block diagram illustrating a preferred translation between the sixty-four (64) bit "WIDE" data bus and the thirty-six (36) bit "NARROW" data cache and instruction cache shown in FIG. 2.

FIG. 3 is a block diagram illustrating a preferred translation between the sixty-four (64) bit "WIDE" data bus 72 and the thirty-six (36) bit "NARROW" data cache 54 and instruction cache 56 shown in FIG. 2. In FIG. 2, this conversion or translation is performed by the bus interface 58. On the left side of the FIG. are shown sixty-four (64) "WIDE" signals 42 entering or leaving a register 40. On the right side of the FIG. are shown thirty-six (36) "NARROW" signals 44 entering or leaving the register 40. The sixty-four (64) "WIDE" signals 42 can be seen as being divided into four groups of sixteen signals per group. Numbering signals [63:0], the four groups are [63:48], [47:32], [31:16], and [15:0]. Each of these sixteen (16) bit groups is further broken into a seven-bit more-significant group of signals, and a nine-bit less-significant group of signals. Thus, the sixteen-bit group of signals [15:0] is broken into a seven-bit group [15:09], and a nine-bit group [08:00]. Likewise, the [63:48] signals are broken into a [63:57] seven-bit and a [56:48] nine-bit group; the [47:32] signals into a [47:41] seven-bit and a [40:32] nine-bit group; and the [31:16] signals into a [31:25] seven-bit and a [24:16] nine-bit group.

The "NARROW" signals 44 can be seen as being divided into four groups of nine (9) signals per group. Numbering the thirty-six (36) signals [35:0], the four groups of signals are [35:27], [26:18], [17:9], and [8:0]. NARROW signals [8:0] are coupled to WIDE signals [8:0]. NARROW signals [17:9] are coupled to WIDE signals [24:16]. NARROW signals [26:18] are coupled to WIDE signals [40:32]. NAR- ROW signals [35:27] are coupled to WIDE signals [56:48]. The remaining WIDE signals ([15:9], [31:25], [47:41], and [63:57]) are preferably discarded on the WIDE 42 to NARROW 44 transition, and set to zero on the NARROW 44 to WIDE 42 transition. In one alternative embodiment, the remaining WIDE signals ([15:9], [31:25], [47:41], and [63:57]) are utilized for error detection and correction for architectures that do not directly support complex error correction. For example, part or all of a given set of WIDE signals (e.g. [15:09]) not coupled to NARROW signals may contain an Error Correction Code (ECC) for the corresponding coupled WIDE signals (e.g. [8:0]).

Figure 4:
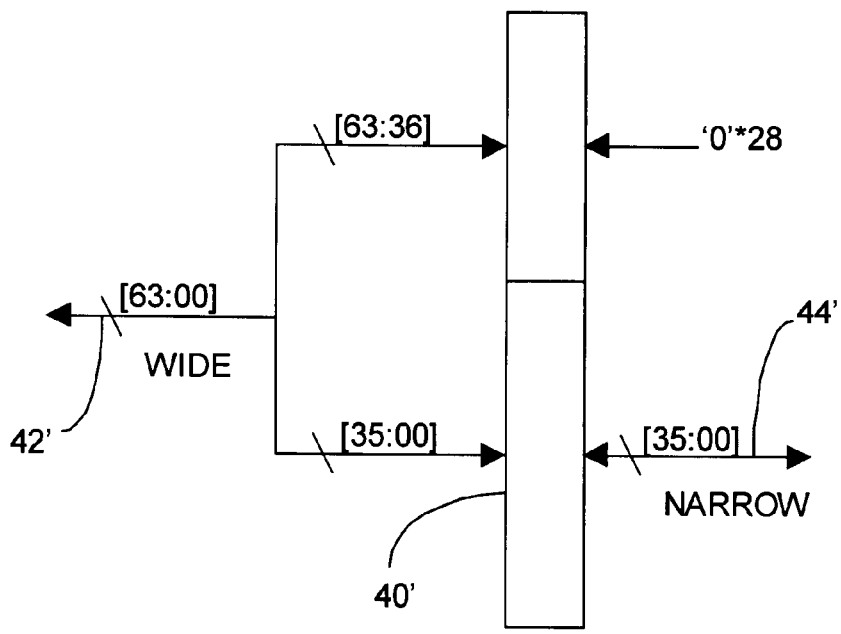
FIG. 4 is a block diagram illustrating a second translation between the sixty-four (64) bit "WIDE" data bus and the thirty-six (36) bit "NARROW" data cache and instruction cache shown in FIG. 2.

FIG. 4 is a block diagram illustrating a second translation between the sixty-four (64) bit "WIDE" data bus 72 and the thirty-six (36) bit "NARROW" data cache 54 and instruction cache 56 shown in FIG. 2. In FIG. 4, this conversion or translation is performed by the bus interface 58. WIDE 42' signals [35:00] are coupled to corresponding NARROW 44' signals [35:00] through a register 40', and the remaining WIDE 42' signals [63:36] are discarded on the WIDE 42' to NARROW 44' transition, and set to zero on the NARROW 44' to WIDE 42' transition.

Figure 5:
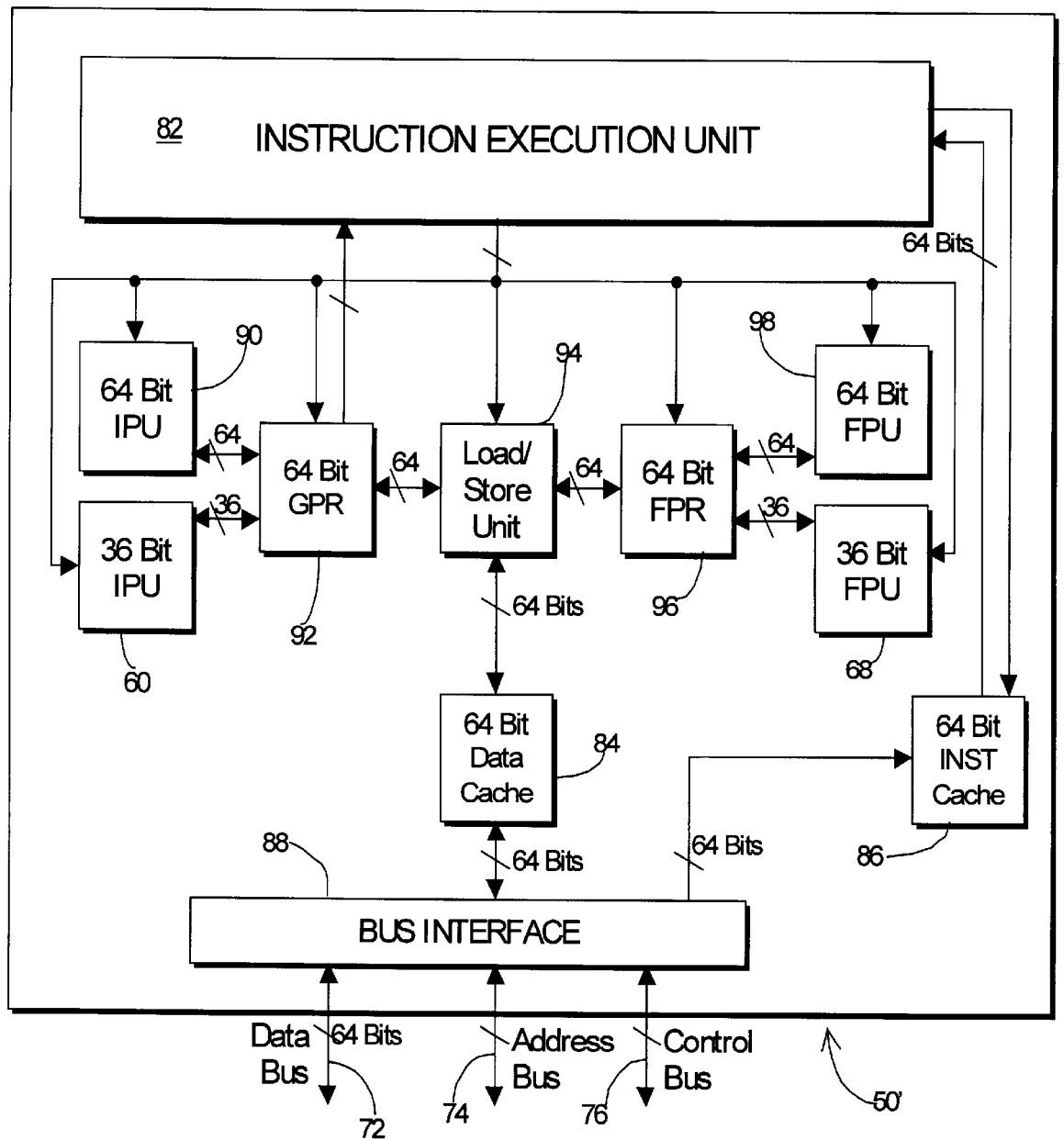
FIG. 5 is a block diagram of a second processor, in accordance with the present invention.

FIG. 5 is a block diagram of a second processor 50', in accordance with the present invention. The processor 50' is coupled to a bus 26. The bus 26 comprises a sixty-four (64) bit data bus 72, a thirty-six (36) bit address bus 74, and a control bus 76. The data bus 72, the address bus 74 and the control bus 76 are coupled to a bus interface 88. The bus interface 88 is coupled to a sixty-four (64) bit data cache 84 and a sixty-four (64) bit instruction cache 86. The sixty-four (64) bit data cache 84 and the sixty-four (64) bit instruction cache 86 are typically constructed of high speed SRAM. The coupling between the data cache 84 and the bus interface 88 is typically bi-directional, whereas the coupling between the bus interface 88 and the instruction cache 86 is typically single directional, since there is typically no need to write instructions back to slower memory 24. In the preferred embodiment, there are sixty-four (64) data signal lines coupling the bus interface 88 with the sixty-four (64) bit data cache 84 and sixty-four (64) bit instruction cache 86.

The sixty-four (64) bit instruction cache 86 is coupled to and provides instructions to an instruction execution unit 82. In this embodiment, the instruction execution unit 82 supports execution of both thirty-six (36) bit instructions, stored in sixty-four (64) bit words, and sixty-four (64) bit instructions. The instruction decode module (not shown) in the instruction execution unit 82 can efficiently distinguish the two (or more) types of instructions that it can execute since thirty-six (36) bit instructions will contain zero in the unused portion of the sixty-four (64) bit words in which they are stored. Typically, such an instruction execution unit 82 provides for pipelined execution of multiple instructions, synchronization of out-of-order execution, and branch prediction. However, these optimizations are not necessary to practice this invention.

The instruction execution unit 82 provides control signals to control execution of a thirty-six (36) bit Integer (or fixed-point operand) Processing Unit 60, a sixty-four (64) bit Integer (or fixed-point operand) Processing Unit 90, sixty-four (64) bit general-purpose (or fixed-point operand) registers 92, a sixty-four (64) bit load/store unit 94, a thirty-six (36) bit floating-point unit 68, a sixty-four (64) bit floating-point unit 98, sixty-four (64) bit floating-point registers 96, the sixty-four (64) bit data cache 84, and the sixty-four (64) bit instruction cache 86. The load/store unit 94 is bidirectionally coupled to the sixty-four (64) bit general-purpose registers 92, the sixty-four (64) bit floating-point registers 96 and the sixty-four (64) bit data cache 54. The sixty-four (64) bit load/store unit 94 loads values into the sixty-four (64) bit general purpose registers 92 and sixty-four (64) bit floating-point registers 96 from the sixty-four (64) bit data cache 84, and writes them back to the sixty-four (64) bit data cache 84, as required.

The sixty-four (64) bit general purpose registers 92 are bidirectionally coupled to and utilized by the thirty-six (36) bit integer processing unit 60 and the sixty-four (64) bit integer processing unit 90 to perform integer (fixed-point) arithmetic, as well as other logical functions. Such integer processing units 60, 90 typically comprise logical/shift modules, integer addition/subtraction modules, and integer multiplication/division modules. The integer processing units 60, 90 will typically set condition code flags in one or more condition code registers in the sixty-four (64) bit general processing registers 92 based on the results of the arithmetic and logical functions performed. These condition code flags are provided to the instruction execution unit 82 for use in conditional branching. In this embodiment, the thirty-six (36) bit integer processing unit 60 provides for thirty-six (36) bit arithmetic and logical functions, and the sixty-four (64) bit integer processing unit 90 provides for sixty-four (64) bit arithmetic and logical functions.

Similarly, the sixty-four (64) bit floating-point registers 96 are bidirectionally coupled to and utilized by the thirty-six (36) bit floating-point unit 68 and the sixty-four (64) bit floating-point unit 98 to perform thirty-six (36) bit and sixty-four (64) bit floating-point arithmetic functions, respectively. The thirty-six (36) bit integer processing unit 60 and the thirty-six (36) bit floating-point unit 68 are controlled by the instruction execution unit 82 in response to encountering thirty-six (36) bit instructions, while the sixty-four (64) bit integer processing unit 90 and the sixty-four (64) bit floating-point unit 98 are controlled by the instruction execution unit 92 in response to encountering sixty-four (64) bit instructions.

The processor 50' shown in FIG. 5 is a sixty-four (64) bit processor, with sixty-four (64) bit data paths between functional units. This sixty-four (64) bit processor can plug into an industry standard sixty-four (64) bit processor slot. This has the advantage that both thirty-six (36) bit and sixty-four (64) bit code can be executed on a single system 20 that utilizes industry standard memory 24, bus 26, secondary storage 30, external storage 32, and other peripherals.

Figure 6:
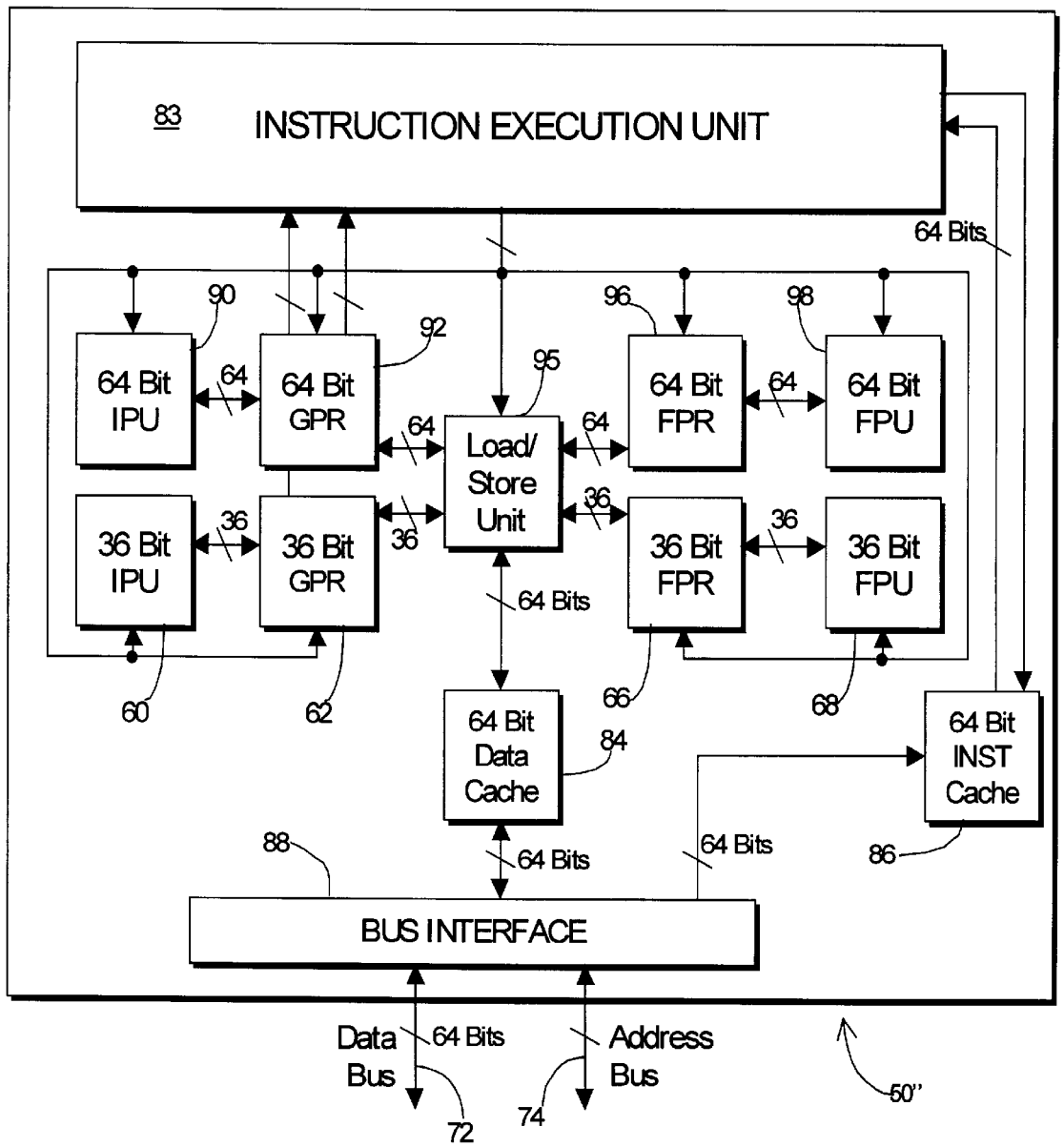
FIG. 6 is a block diagram of a third processor, in accordance with the present invention.

FIG. 6 is a block diagram of a third processor 50", in accordance with the present invention. This embodiment differs from the embodiment shown in FIG. 5 by including both thirty-six (36) bit and sixty-four (64) bit general purpose (or fixed-point operand) and floating-point registers. The processor 50" is coupled to a bus 26. The bus 26 comprises a sixty-four (64) bit data bus 72, an address bus 74, and a control bus 76. The sixty-four (64) bit data bus 72, the address bus 74 and the control bus 76 are coupled to a bus interface 88. The bus interface 88 is coupled to a sixty-four (64) bit data cache 84 and a sixty-four (64) bit instruction cache 86. The sixty-four (64) bit data cache 84 and the sixty-four (64) bit instruction cache 86 are typically constructed of high speed SRAM. The coupling between the sixty-four (64) bit data cache 84 and the bus interface 88 is typically bi-directional, whereas the coupling between the bus interface 88 and the sixty-four (64) bit instruction cache 86 is typically single-directional, since there is typically no need to write instructions back from the sixty-four (64) bit instruction cache 86 to slower memory 24. In the preferred embodiment, there are sixty-four (64) data signal lines coupling the bus interface 88 with the sixty-four (64) bit data cache 84 and sixty-four (64) bit instruction cache 86.

The sixty-four (64) bit instruction cache 86 is coupled to and provides instructions to an instruction execution unit 83. In this embodiment, the instruction execution unit 82 supports execution of both thirty-six (36) bit instructions, stored in sixty-four (64) bit words, and sixty-four (64) bit instructions. The instruction decode module (not shown) in the instruction execution unit 83 can efficiently distinguish the two (or more) types of instructions that it can execute since all the thirty-six (36) bit instructions will contain zero in the unused portion of the sixty-four (64) bit words in which they are stored. Typically, such an instruction execution unit 83 provides for pipelined execution of multiple instructions, synchronization of out-of-order execution, and branch prediction. However, these optimizations are not necessary to practice this invention.

The instruction execution unit 83 provides control signals to control execution of a thirty-six (36) bit Integer (or fixed-point operand) Processing Unit 60, a sixty-four (64) bit Integer (or fixed-point operand) Processing Unit 90, thirty-six (36) bit general-purpose (or fixed-point operand) registers 62, sixty-four (64) bit general-purpose (or fixed-point operand) registers 92, a sixty-four (64) bit load/store unit 94, a thirty-six (36) bit floating-point unit 68, a sixty-four (64) bit floating-point unit 98, thirty-six (36) bit floating-point registers 66, sixty-four (64) bit floating-point registers 96, the sixty-four (64) bit data cache 84, and the sixty-four (64) bit instruction cache 86. The load/store unit 94 is bidirectionally coupled to the thirty-six (36) bit general-purpose registers 62, the sixty-four (64) bit general-purpose registers 92, the thirty-six (36) bit floating-point registers 66, the sixty-four (64) bit floating-point registers 96 and the sixty-four (64) bit data cache 54. The sixty-four (64) bit load/store unit 94 loads values into the thirty-six (36) bit general purpose registers 62, the sixty-four (64) bit general purpose registers 92, the thirty-six (36) bit floating-point registers 66 and the sixty-four (64) bit floating-point registers 96 from the sixty-four (64) bit data cache 84, and writes them back to the sixty-four (64) bit data cache 84, as required.

The thirty-six (36) bit general purpose registers 62 are utilized by the thirty-six (36) bit integer (or fixed-point operand) processing unit 60 and the sixty-four (64) bit general purpose registers 92 are utilized by the sixty-four (64) bit integer (or fixed-point operand) processing unit 90 to perform integer arithmetic, as well as other logical functions. Such integer processing units 60, 90 typically comprise logical/shift modules, integer addition/subtraction modules, and integer multiplication/division modules. The integer processing units 60, 90 will typically set condition code flags in one or more condition code registers in the thirty-six (36) bit general-purpose (or fixed-point operand) registers 62 and the sixty-four (64) bit general-purpose (or fixed-point operand) registers 92 based on the results of the arithmetic and logical functions performed. These condition code flags are provided to the instruction execution unit 82 for use in conditional branching. In this embodiment, the thirty-six (36) bit integer processing unit 60 is bidirectionally coupled to the thirty-six (36) bit general-purpose registers 62 and provides for thirty-six (36) bit fixed-point arithmetic and logical functions, and the sixty-four (64) bit integer processing unit 90 is bidirectionally coupled to the sixty-four (64) bit general-purpose registers 92 and provides for sixty-four (64) bit fixed-point arithmetic and logical functions.

Similarly, the thirty-six (36) bit floating-point registers 66 and the sixty-four (64) bit floating-point registers 96 are bidirectionally coupled to and utilized by the thirty-six (36) bit floating-point unit 68 and the sixty-four (64) bit floating-point unit 98 to perform thirty-six (36) bit and sixty-four (64) bit floating-point arithmetic functions, respectively. The thirty-six (36) bit integer processing unit 60 and the thirty-six (36) bit floating-point unit 68 are controlled by the instruction execution unit 82 in response to encountering thirty-six (36) bit instructions, while the sixty-four (64) bit integer processing unit 90 and the sixty-four (64) bit floating-point unit 98 are controlled by the instruction execution unit 92 in response to encountering sixty-four (64) bit instructions.

The processor 50" shown in FIG. 6 is a hybrid thirty-six (36) and sixty-four (64) bit processor, with sixty-four (64) bit data paths between most functional units, and thirty-six (36) bit data paths between the remaining functional units. This hybrid thirty-six (36) and sixty-four (64) bit processor can plug into an industry standard sixty-four (64) bit processor slot. This has the advantage that both thirty-six (36) bit and sixty-four (64) bit code can be executed on a system that utilizes industry standard memory 24, bus 26, secondary storage 30, external storage 32, and other peripherals.

FIGS. 5 and 6 illustrated processors 50', 50" capable of executing both thirty-six (36) bit "NARROW" and sixty-four (64) bit "WIDE" instructions. Both types of instructions are stored in sixty-four (64) bit words that are fetched from the in sixty-four (64) bit instruction cache 86. Two different formats for storing the "NARROW" instructions in the "WIDE" words in memory are shown in FIGS. 3 and 4. Other storage formats are also within the scope of this invention.

The "NARROW" instructions supported for execution by the processors 50, 50', 50" in FIGS. 2, 5, and 6 are typically legacy instructions. In the preferred embodiment, the "NARROW" instruction set supported is the thirty-six (36) bit GCOS® 8 instruction set. The processors 50, 50', 50" shown in FIGS. 2, 5, and 6 provide the ability to execute existing "NARROW" code on a "WIDE" processor. However, the processors 50', 50" shown in FIGS. 5 and 6 also provide for executing different instruction formats and types. In one embodiment, the "WIDE" instructions supported are sixty-four (64) bit RISC instructions. In another embodiment, the "WIDE" instructions supported are from an instruction set tailored to efficiently execute Java byte codes. In yet another embodiment, the "WIDE" instructions supported are Very Long Instruction Word (VLIW) instructions. In another embodiment, the "WIDE" instructions supported are from an explicitly parallel instruction set (EPIC), such as implemented by the Intel® Merced® family of processors.

FIGS. 5 and 6 show separate Narrow Integer Processing Units 60 and Wide Integer Processing Units 90. Similarly, these FIGs. show separate Narrow-Floating-point Units 68 and Wide Floating-Point Units 98. On the other hand, a single Instruction Execution Unit 82 is shown that provides for both Wide and Narrow instruction decode. In the preferred embodiment, the Narrow Integer (or Fixed-Point) Processing Unit 60 and the Wide Integer (or Fixed-Point) Processing Unit 90 are implemented as a single operational unit that selectively operates on either Wide fixed-point operands or Narrow fixed-point operands. In such an implementation, the common Integer Processing Unit will contain common circuitry, Wide operand circuitry, and Narrow operand circuitry. Execution of Wide fixed-point operand instructions will activate the common circuitry and the Wide operand circuitry, while execution of Narrow fixed-point operand instructions will activate the common circuitry and the Narrow operand circuitry. The preferred embodiment is similar for the Floating-Point Units 68, 98, and instruction decode in the Instruction Execution Unit 82. However, embodiments where some or all of these functions are implemented as separate functional units are also within the scope of this invention.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A data processing system comprising:
   a processor bus comprising:
      a set of processor data lines, wherein:
   the set of processor data lines comprises a first integer number of significant data lines;
      a processor responsively coupled to the processor bus comprising:
         a first means for decoding a first set of instructions received over the set of processor data lines, wherein:
            the first set of instructions each contains a second integer number of significant bits,
            a third integer number of bits equals the difference between the first integer number and the second integer number,
            the first integer number is greater than the second integer number, and
            the third integer number of bits are ignored during instruction decode;
      a first means for performing fixed point arithmetic operations in response to instruction decode by the first decoding means on a first set of fixed point operands received over the set of processor data lines, wherein:
         each of the first set of fixed point operands contains the second integer number of bits, and
         the third integer number of bits received over the set of processor data lines are ignored during fixed point arithmetic operations; and
      a second means for performing fixed point arithmetic operations on a second set of fixed point operands received over the set of processor data lines, wherein:
         each of the second set of fixed point operands contains the first integer number of bits.

2. The data processing system in claim 1 wherein:
   the first integer number is sixty-four,
   the second integer number is thirty-six, and
   the third integer number is twenty-eight.

3. The data processing system in claim 1 wherein:
   the first integer number is sixty-four,
   the second integer number is forty-eight, and
   the third integer number is sixteen.

4. The data processing system in claim 1 wherein the processor further comprises:
   a first set of fixed point registers coupled to the first fixed point arithmetic means, wherein:
      each of the first set of fixed point registers has the second integer number of significant bits, and
      the first set of fixed point registers provides fixed point operands to and registers fixed point arithmetic results from the first fixed point arithmetic means; and
   a second set of fixed point registers coupled to the second fixed point arithmetic means, wherein:
      each of the second set of fixed point registers has the first integer number of significant bits, and
      the second set of fixed point registers provides fixed point operands to and registers fixed point arithmetic results from the second fixed point arithmetic means.

5. The data processing system in claim 1 wherein the processor further comprises:
   a first set of fixed point registers coupled to the first fixed point arithmetic means and to the second fixed point arithmetic means, wherein:
      each of the first set of fixed point registers has the first integer number of significant bits, and
      the first set of fixed point registers selectively provides fixed point operands to and registers fixed point arithmetic results from the first fixed point arithmetic means or the second fixed point arithmetic means.

6. The data processing system in claim 1 wherein the processor further comprises:
   a first means for performing floating point operations in response to instruction decode by the first decoding means on a first set of floating point operands received over the set of processor data lines, wherein:
      each of the first set of floating point operands contains the second integer number of bits, and
      the third integer number of bits received over the set of processor data lines are ignored during floating point arithmetic operations; and
   a second means for performing floating point operations on a second set of floating point operands received over the set of processor data lines, wherein:
      each of the second set of floating point operands contains the first integer number of bits.

7. The data processing system in claim 6 wherein the processor further comprises:
   a first set of floating point registers coupled to the first floating point arithmetic means, wherein:
      each of the first set of floating point registers has the second integer number of significant bits, and
      the first set of floating point registers provides floating point operands to and registers floating point arithmetic results from the first floating point arithmetic means; and
   a second set of floating point registers coupled to the second floating point arithmetic means, wherein:
      each of the second set of floating point registers has the first integer number of significant bits, and
      the second set of floating point registers provides floating point operands to and registers floating point arithmetic results from the second floating point arithmetic means.

8. The data processing system in claim 6 wherein the processor further comprises:
   a first set of floating point registers coupled to the first floating point arithmetic means and the second floating point arithmetic means, wherein:
      each of the first set of floating point registers has the first integer number of significant bits,
      the first set of floating point registers selectively provides floating point operands to and registers floating point arithmetic results from the first floating point arithmetic means and the second floating point arithmetic means, and
      the third integer number of bits from the second set of floating point registers are ignored by the first floating point arithmetic means.

9. The data processing system in claim 1 wherein the processor further comprises:
a first cache memory coupled to and providing instructions from the first set of instructions to the first decoding means, wherein:
a fourth integer number is the product of the first integer number multiplied times a fifth integer number,
the first cache memory contains a first plurality of cache lines,
each of the first plurality cache lines contains the fourth integer number of bits, and
the fifth integer number is a power of two.

10. The data processing system in claim 9 wherein the processor further comprises:
a second cache memory coupled to and providing the first set of fixed point operands to the first fixed point arithmetic means, wherein:
the second cache memory contains a second plurality of cache lines,
each of the second plurality cache lines contains the fourth integer number of bits.

11. The data processing system in claim 1 wherein the processor further comprises:
a second means for decoding a second set of instructions received over the set of processor data lines wherein:
the second set of instructions each contains a fourth integer number of significant bits, and
the fourth integer number is greater than the second integer number.

12. The data processing system in claim 11 wherein:
the second set of instructions comprise a RISC instruction set.

13. The data processing system in claim 12 wherein:
the second set of instructions comprise a VLIW instruction set.

14. The data processing system in claim 11 wherein:
the second set of instructions comprise a EPIC instruction set.

15. The data processing system in claim 11 wherein:
the second set of instructions comprise a Java Byte Code instruction set.

16. A data processing system comprising:
a processor bus comprising:
a set of processor data lines, wherein:
the set of processor data lines comprises a first integer number of significant data lines;
a processor responsively coupled to the processor bus comprising:
a first means for decoding a first set of instructions received over the set of processor data lines, wherein:
the first set of instructions each contains a second integer number of significant bits,
a third integer number of bits equals the difference between the first integer number and the second integer number,
the first integer number is greater than the second integer number, and
the third integer number of bits are ignored during instruction decode;
a first means for performing fixed point arithmetic operations in response to instruction decode by the first decoding means on a first set of fixed point operands received over the set of processor data lines, wherein:
each of the first set of fixed point operands contains the second integer number of bits, and
the third integer number of bits received over the set of processor data lines are ignored during fixed point arithmetic operations;
a second means for performing fixed point arithmetic operations on a second set of fixed point operands received over the set of processor data lines, wherein:
each of the second set of fixed point operands contains the first integer number of bits;
a first set of fixed point registers coupled to the first fixed point arithmetic means, wherein:
each of the first set of fixed point registers has the second integer number of significant bits, and
the first set of fixed point registers provides fixed point operands to and registers fixed point arithmetic results from the first fixed point arithmetic means;
a second set of fixed point registers coupled to the second fixed point arithmetic means, wherein:
each of the second set of fixed point registers has the first integer number of significant bits, and
the second set of fixed point registers provides fixed point operands to and registers fixed point arithmetic results from the second fixed point arithmetic means;
a first means for performing floating point operations in response to instruction decode by the first decoding means on a first set of floating point operands received over the set of processor data lines, wherein:
each of the first set of floating point operands contains the second integer number of bits, and
the third integer number of bits received over the set of processor data lines are ignored during floating point arithmetic operations;
a second means for performing floating point operations on a second set of floating point operands received over the set of processor data lines, wherein:
each of the second set of floating point operands contains the first integer number of bits;
a first set of floating point registers coupled to the first floating point arithmetic means, wherein:
each of the first set of floating point registers has the second integer number of significant bits, and
the first set of floating point registers provides floating point operands to and registers floating point arithmetic results from the first floating point arithmetic means; and
a second set of floating point registers coupled to the second floating point arithmetic means, wherein:
each of the second set of floating point registers has the first integer number of significant bits, and
the second set of floating point registers provides floating point operands to and registers floating point arithmetic results from the second floating point arithmetic means.

17. A data processing system comprising:
a processor bus comprising:
a set of processor data lines, wherein:
the set of processor data lines comprises a first integer number of significant data lines;
a processor responsively coupled to the processor bus comprising:
a first means for decoding a first set of instructions received over the set of processor data lines, wherein:

the first set of instructions each contains a second integer number of significant bits, a third integer number of bits equals the difference between the first integer number and the second integer number, the first integer number is greater than the second integer number, and the third integer number of bits are ignored during instruction decode;

a first means for performing fixed point arithmetic operations in response to instruction decode by the first decoding means on a first set of fixed point operands received over the set of processor data lines, wherein:

each of the first set of fixed point operands contains the second integer number of bits, and the third integer number of bits received over the set of processor data lines are ignored during fixed point arithmetic operations;

second means for performing fixed point arithmetic operations on a second set of fixed point operands received over the set of processor data lines, wherein:

each of the second set of fixed point operands contains the first integer number of bits;

a first set of fixed point registers coupled to the first fixed point arithmetic means and to the second fixed point arithmetic means, wherein:

each of the first set of fixed point registers has the first integer number of significant bits, and the first set of fixed point registers selectively provides fixed point operands to and registers fixed point arithmetic results from the first fixed point arithmetic means or the second fixed point arithmetic means;

a first means for performing floating point operations in response to instruction decode by the first decoding means on a first set of floating point operands received over the set of processor data lines, wherein:

each of the first set of floating point operands contains the second integer number of bits, and the third integer number of bits received over the set of processor data lines are ignored during floating point arithmetic operations;

a second means for performing floating point operations on a second set of floating point operands received over the set of processor data lines, wherein:

each of the second set of floating point operands contains the first integer number of bits; and a first set of floating point registers coupled to the first floating point arithmetic means and the second floating point arithmetic means, wherein:

each of the first set of floating point registers has the first integer number of significant bits, the first set of floating point registers selectively provides floating point operands to and registers floating point arithmetic results from the first floating point arithmetic means and the second floating point arithmetic means, and the third integer number of bits from the second set of floating point registers are ignored by the first floating point arithmetic means.

* * * * *